United States Patent
Patouraux et al.

(10) Patent No.: US 6,403,176 B1
(45) Date of Patent: Jun. 11, 2002

(54) PACKAGING LAMINATE FOR BAGS

(76) Inventors: Andre Patouraux; Philippe Patouraux, both of rue de la Sapinière, 5, B-1390 Nethen (BE)

( * ) Notice: Subject to any disclaimer, the term of this patent is extended or adjusted under 35 U.S.C. 154(b) by 0 days.

(21) Appl. No.: 09/019,111

(22) Filed: Feb. 5, 1998

Related U.S. Application Data

(63) Continuation-in-part of application No. 08/648,086, filed on May 28, 1996, now Pat. No. 5,794,408.

(30) Foreign Application Priority Data

Dec. 8, 1993 (BE) .............................. 9301362

(51) Int. Cl.$^7$ ........................... B32B 7/00; B32B 27/00
(52) U.S. Cl. ................. 428/35.2; 428/195; 428/201; 428/337; 428/339; 428/340; 428/910; 428/458; 428/461; 428/483; 428/516; 428/518; 156/244.11
(58) Field of Search ............................... 428/516, 518, 428/520, 195, 201, 483, 458, 461, 463, 910, 35.2, 35.4, 337, 339, 340; 156/244.11

(56) References Cited

U.S. PATENT DOCUMENTS

| | | | |
|---|---|---|---|
| 3,521,806 A | 7/1970 | Esty | 229/117.3 |
| 4,055,931 A | 11/1977 | Myers | 53/408 |
| 4,344,467 A | 8/1982 | Lahde | 141/66 |
| 4,894,997 A | 1/1990 | Urushizaki et al. | 62/78 |
| 4,911,317 A | 3/1990 | Schloesser et al. | 220/1.5 |
| 5,028,443 A | 7/1991 | Wade | 426/312 |
| 5,111,639 A | 5/1992 | Bolejack et al. | 53/408 |
| 5,203,138 A | 4/1993 | Schvester et al. | 53/428 |
| 5,528,880 A | 6/1996 | Landholt | 53/432 |
| 5,794,408 A | * 8/1998 | Patouraux | 53/432 |

FOREIGN PATENT DOCUMENTS

| | | |
|---|---|---|
| DE | 29 21 706 | 12/1980 |
| FR | 2218250 | * 9/1974 |
| FR | 2 653 407 | 4/1991 |
| GB | 1526722 | * 9/1978 |
| GB | 1526723 | * 9/1978 |
| GB | 1526724 | * 9/1978 |
| WO | 93/14928 | * 8/1993 |

OTHER PUBLICATIONS

International Search Report for PCT/BE94/00093, Jun. 29, 1995.

* cited by examiner

Primary Examiner—Rena L. Dye
(74) Attorney, Agent, or Firm—Merchant & Gould P.C.

(57) ABSTRACT

The present invention relates to improved cover laminates with high performance for forming covers for industrial packaging. The laminates include substantially one layer of metallized polyester, and one or two layers of a special polyethylene layer supplied as a crossed film. The laminate may be made by an extrusion process carried out at 300° C., by glue lamination, or a combination of the two.

14 Claims, 1 Drawing Sheet

PACKAGING LAMINATE FOR BAGS

This is a continuation-in-part application of application Ser. No. 08/648,086, filed May 28, 1996 now U.S. Pat. No. 5,794,408.

FIELD OF THE INVENTION

The present invention relates to packaging laminates for bags, more particularly for industrial covers.

BACKGROUND OF THE INVENTION

In industrial packaging, various packaging laminates are conventionally formed by gluing an aluminum foil on one side to a polyester layer and on the other side to a plastic film such as polyethylene, in order to protect items packaged in the cover from moisture and contaminants. This implies that the layers of the laminate should be flat because the quantity of glue should be small, otherwise the laminate becomes stiff and difficult to handle. The cover is generally treated with a vacuum pump which puts the items inside the cover under a partial vacuum. A quantity of drying agent, such as silica gel, the amount of which is calculated according to the volume of the bag and the country of destination (due to weather conditions to be expected there), is inserted into the cover to absorb moisture.

This system suffers from various problems both from a technical point of view and in the method being used to protect items.

First, the prior art cover laminates are not strong enough. They have a poor tear resistance, initiated tear resistance and puncture resistance. During the manufacture of the covers, they are frequently torn out by sharp edged items and have to be replaced.

Most items to be packaged have irregular shapes and this problem may occur a number of times. Even after arrival at the destination, a simple sharp edge may compromise the cover, making the content of the cover unusable. Consequently, the packager has to reinforce acute angles of the item inside the cover by a protecting material. But even with such a reinforcement material, problems usually occur. Moreover the reinforcement material is generally an open cell material which has absorbed moisture. The material exhausts the moisture inside the cover, which may lead to corrosion of the items packaged. Thus, users of such packages are faced with high production costs due to the replacement of covers, the reinforcement material being used, the labor costs involved and further problems when items arrive at a destination and are stored for a period of time. Moreover, it is not 100% sure that the items packaged will be well protected during the transportation.

Secondly, the prior art cover materials have a board-like metallic aspect and are quite hard to handle and conveniently fold. Consequently, during their manipulation, various weakening points appear mainly at the folded parts of the cover and the aluminum foil is partially destroyed, making a pinhole cloud noticeable by transparency. These defects are not 100% visible to the workers because they are not supposed to check the products, but to weld them.

Thirdly, the prior art cover materials are made by lamination with glue applied at a low temperature. Since welding of the seals is carried out at a high temperature (190 to 220° C.), the chemical structure of the glue is altered and the welded seals are partly destroyed. They are so weak that even the producers draw customers' attention on them in their specification sheets. The only advantage of the glue is that it reinforces the tensile strength of the final product, but artificially, because the main characteristics are given by the other components which are generally not as strong.

Fourthly, the prior art cover materials have a small heat conductivity because heat applied by a welding grip is not easily transferred. Only the aluminum foil has a high heat conductivity and heat has to be applied longer with a high pressure, which also leads to a destruction of the glue and to poor seals.

Fifthly, prior art cover materials have no good water vapor transmission rate. Since the polyester is a transparent sheet of only 12 $\mu$m thickness and the back side is a polyethylene sheet of 80/90 $\mu$m thickness—both products being quite vapor permeable—the main permeation rate is given by the aluminum foil (9 $\mu$m or 7 $\mu$m thickness). It is to be noticed that the water vapor transmission rate of transparent polyester is as high as +/− 20 g/sqm/24 hours and is more or less the same for polyethylene. This is to be compared with the water vapor transmission rate required by the American standard MIL B 131 H which is only 0.3 g/sqm/24 hours. The aluminum foil is quite thin and can be partially destroyed during the manufacture of the cover. Moreover the glue is quite hard and when the product is folded glue particles may be pushed into the foil and damage it severely. Consequently, the prior art cover materials are not 100% reliable for their water vapor transmission rate which is quite high even if it is within the requirements of the American standard specifications.

Sixthly, due to the various above-mentioned problems, the process used to protect goods by quick exhaustion of the inner atmosphere by a vacuum pump is poor, because the covers are not 100% gas-proof and after a certain time moisture-loaded air substantially enters the covers and the drying agent is soon saturated. Others have tried to inject nitrogen into the covers to dry the items inside, but the problems remain and various customers have experienced substantial damage even if everything seemed to be correct when their goods were packed.

In summary, prior art cover materials are quite poor in their characteristics and even dangerous for the valuable goods they are supposed to protect. Moreover, even if their price is quite low, they incur substantial additional costs due to all the problems arising during their manufacture and later on upon their transportation and storage. Added insurance costs are also a consequence.

Consequently, there remains a need on the market for improved high barrier cover materials with a very low water vapor transmission rate, with high tear, puncture, initiated tear and impact resistance, easily sealable and quite flexible. The improved cover material may be used in a temperature range between 40 and 70° C. The improved cover material should have also an excellent quality/price ratio.

SUMMARY OF THE INVENTION

The present invention relates to new improved cover laminates with high level performances for forming covers for industrial packaging, which comprises substantially one layer of metallized polyester, and one or two layers of a special polyethylene to be discussed more in detail below.

In one aspect, the laminate is made by an extrusion process carried out at 300° C. and the interlayers are formed with a special polyethylene mix discussed further in the specification.

In another aspect, the laminate is made partly by extrusion and partly by glue lamination to improve price while maintaining high performance characteristics.

The laminates are useful for making covers for protecting industrial and/or military items of high value during their transportation and/or storage, with or without an inerting gas system. The various items include all types of machinery, spare parts, complete plants, tanks, weapons, missiles, bombs, explosives, planes, but also items as small as electronic chips.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
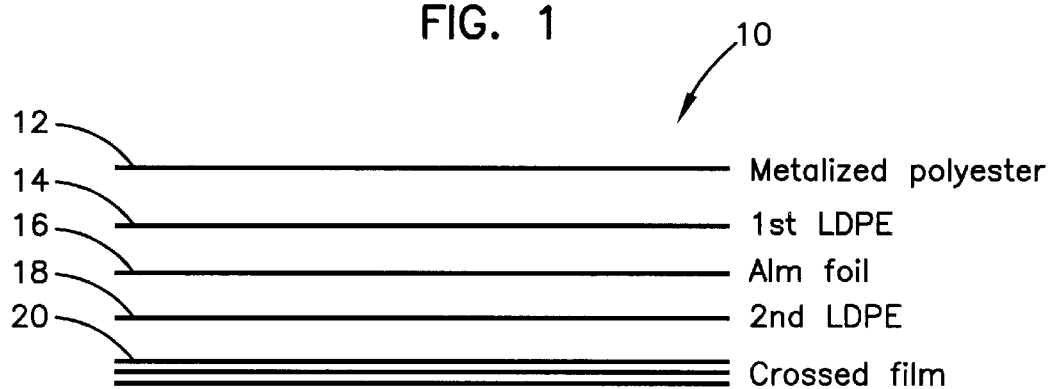
FIG. 1 is an illustration of the separate layers forming a first embodiment of a laminate according to the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DESCRIPTION OF THE INVENTION

The present invention relates to new improved high barrier cover laminates with high level performance for packaging industrial items. The cover generally comprises one layer of metallized polyester, one layer of aluminum foil and one or two layers of a special polyethylene (to be discussed more in detail below). All layers being bonded by special tie layers through extrusion steps at 300° C. The various components will be discussed more in detail below.

Crossed film

High barrier cover laminates typically use a special multilayer polyethylene film called XF film in England (Medway) or VALCROSS film in Belgium (Van leer). This film which has received other names in other countries (for simplicity, it is referred to as crossed film) has been patented under the Patent Numbers GB-A-1,526,722, GB-A-1,526,723 and GB-A-1,526,724 the teachings of which are incorporated in the present application by reference. The crossed film is a film in the thickness range of 45 to 180 g/sqm formed with a biaxially-stretched composite film of polyolefins in three or four layers, the inner portion of which, being present at 70–80%, is made of an olefin blend so as to obtain by laminating and stretching an interleaved arrangement which gives a higher strength, but also various other good properties. The inner portion of the crossed film includes the inner layer or layers.

The crossed film is consequently made with three or four layers and is a laminate itself. However, it is not assembled with glue, but is assembled using pressure and heat. That means that the layers are able to move elastically mutually and as a consequence, the final cover laminate has high impact, tear, initiated tear and puncture resistance. Tensile strength is also high. Experiments have shown that a crossed film made with various layers is much more resistant than a single film of the same thickness.

Moreover, for the same reason, the crossed film resists most chemical products and temperature extremes in the range from minus 40° C. to plus 70° C. The crossed film can remain outdoors for 18 months with no alteration, which means that its degree of preservation is higher when it is used inside a cover as it is the case here. Moreover the crossed film is fully flexible. It can be sealed to manufacture a cover not only with a pulse grip, but also with a welding grip. No other product on the market is capable of being sealed both ways.

Again due to the special structure of the crossed film, water vapor permeation rate for crossed film of 70 g/sqm for example is only 2.0 g/sqm/24 hours compared to 4.0 for HDPE 20 microns.

One of the problems presented by the crossed film is its profile. The crossed film has regular ribs distributed over its surface and consequently it is quite difficult to laminate with glue. The glue has some tendency to adhere to the tops of the peaks and not with the whole surface of a film with which it is laminated. As a consequence, the final laminate is easily delaminated. Thus, glue laminators are unwilling to use this crossed film for laminates for industrial packaging. They need a flat surface and prefer to use plain polyethylene or Valeron.

Moreover, although the crossed film has quite good performance when used as such, it does not perform well as an industrial laminate. In fact, in the American standard MIL B 131 H, an oil test is made on small bags at 70° C. for 24 hours. With the regular crossed film, the test result was bad. The layers of the crossed film were taken apart and the Mil B 131 H test failed. As a consequence, the crossed film had to be improved by a heat treatment and/or an EPDM coating to make the product more compact and more oil resistant.

Due to all those problems and in spite of the high performances of the products, the crossed film is only used for bags for pet food or other commodity products that require mainly a high strength and the sales are insignificant.

Polyester

Polyester used for the new high performance cover laminates is polyethylene terephthalate (PET) in a thickness of 12 $\mu$m. Polyethylene naphtalate (PEN) can be used too. The polyester is always metallized for reasons to be discussed hereafter. Other products may be used like EVOH for particular applications.

Aluminum Foil

It may be an aluminum foil of 7, 9, 12 or 25 $\mu$m according to the various substances of the cover laminates. Purity should be 99.99%.

Note: The assembly of polyester+tie layer+aluminum foil may be replaced by a transparent aluminum-free product such as Aclar from Allied Signal for special applications.

Tie Layers

The tie layers are formed with a polymer blend of BOREALIS LE7530 type material or similar. This product is useful because a) it closes the possible pinholes of the aluminum foil, b) it promotes a high adhesion of the foil with the crossed film, c) due to its chemical composition, it is fully compatible with the crossed film, d) it has a low permeability for water vapor and gases, and thus contributes to the low overall vapor and gas permeability of the film, e) its processability is similar to that of standard LDPE and f) it is heat conductive an operates well at elevated temperatures, for example in excess of 300° C. The polymer blend may be a mixture of LE7530 material and LDPE mixed with a ratio between 50%/50% and 25%/75%.

All those components are used to create new high performance laminates for industrial packaging. The advantages and the unique features thereof are described below.

Cover Laminates

In the packaging industry, materials have been developed around the American standard MIL B 131 H which is the reference. Certification reports of the laminates are to be printed on the products to be able to sell them.

The present cover laminates have many advantages that have not been reached up to now by the competition on various respects.

First of all, all the cover laminates according to the invention are preferably made by extrusion of polyethylene (PE) at a temperature of 300° C. Mainly, the valleys between the peaks of the crossed film are filled with PE until the surface is more or less flat. In general, a layer weight of 30–40 g/sqm is provided between the aluminum foil and the crossed film. A layer weight of 20 g/sqm is sufficient between the metallized polyester and the aluminum foil.

In order to reduce prices while maintaining performance, in another aspect of the invention, a glue lamination may be carried out between the metallized polyester and the aluminum foil. In a further aspect, the whole laminate may be manufactured by glue laminating particularly if it is to make bags for small spare parts or for short-term packaging on the condition that the conversion is made on special machines working on big reels in order not to give enough time to the laminates to delaminate.

The cover laminates according to the invention are highly flexible and make their handling easier for the packager. Moreover, due to the fact that there are two aluminum foils, one very thin (metallization) and the regular foil, when the welding grip is applied at a temperature of 180–200° C., the heat wave front goes rapidly through the tie layers towards the crossed film which is melted and welded instantaneously. A simple compression of the welding grip of 2 sec allows to seal the cover in contrast to the prior art laminates, whence again time and labor benefit. In fact, experiments have shown that two aluminum foils accelerate the process much more than a single thicker aluminum foil, even if the metallization film is quite thin. Consequently the seals are very strong and reliable.

Another important aspect is the water vapor transmission rate. Apparently each layer participates in a low water vapor transmission rate because each layer brings its own contribution. Consequently, the water vapor transmission rate is well below that of the prior art cover laminates as mentioned hereinafter in the exemplary embodiments. A low water vapor transmission rate is an important feature when working under vacuum in a conventional manner. That means that, once under vacuum, no moisture will enter the covers. That also means that the quantity of drying agent being used is lower, hence a lower cost. In the case of nitrogen treatment, the modified atmosphere remains unmodified inside the cover as explained in an exemplary embodiment hereinafter in the specification.

It is to be understood that the final cover laminates have inherited various characteristics from the crossed film: impact, tear, puncture resistance and tensile strength. Moreover, the present cover laminates have an excellent initiated tear resistance which is absent in prior art cover laminates. It is an important feature to avoid any tear problem by a sharp edged part when manufacturing the cover around the part. In fact, when it occurs—rarely—the hole produced will not spread out in all directions and the laminate does not need to be replaced. It is sufficient to seal the hole with a welding grip and progression of the hole is stopped, thus producing a time and labor benefit.

Because the aluminum foil is well protected by both PE layers, there is no risk that it will be damaged or destroyed by handling the laminates when welding. Finally, most sharp-edged items can be packed with no inside protection. In some extreme cases, a protection made with a small section of one of the laminates—which does not evolve any moisture—will be sufficient to protect the whole bag.

Some products have been found particularly useful in this respect; they are formed with at least a crossed film between 70 and 300 g/sqm, an aluminum foil or EVOH or another material suitable for improving the gas-tightness, particularly a water vapor tightness, and any other product to improve the aspect or the efficiency, including another crossed film between 70 and 300 g/sqm.

The crossed film is a biaxially stretched laminated film of polyolefins in three or four plies, the inner portion of which, being present at 70–80%, comprises a mixture of olefins so as to obtain, by laminating and stretching, an interlocked arrangement which gives a higher strength, as above-mentioned. The inner portion includes the inner layer or layers.

Crossed film can thus be considered as a triaxial or quadriaxial film.

Preferably, the crossed film is a film between 70 and 180 g/sqm. This grade can be used in overpressure or in equipressure according to the needs.

The present invention also relates to all products manufactured with similar films.

Examples of laminates include more particularly the products marketed under the trademarks MILPAC/CEPAC7 113, 113 Plus, 143 and 153, laminates amongst others, described further in details below. These examples are presented for illustration purposes and are not intended to limit the invention in any way.

EXAMPLES

Example 1

A first example of a laminate is MILPAC 113, shown in a separated view in FIG. 1. The MILPAC 113 laminate 10 is made up of the following layers:

17 g/sqm metallized polyester 12
20 g/sqm LDPE 14
54 g/sqm aluminum foil 16
40 g/sqm LDPE 18
150 g/sqm crossed film 20

Example 2

Figure 2:
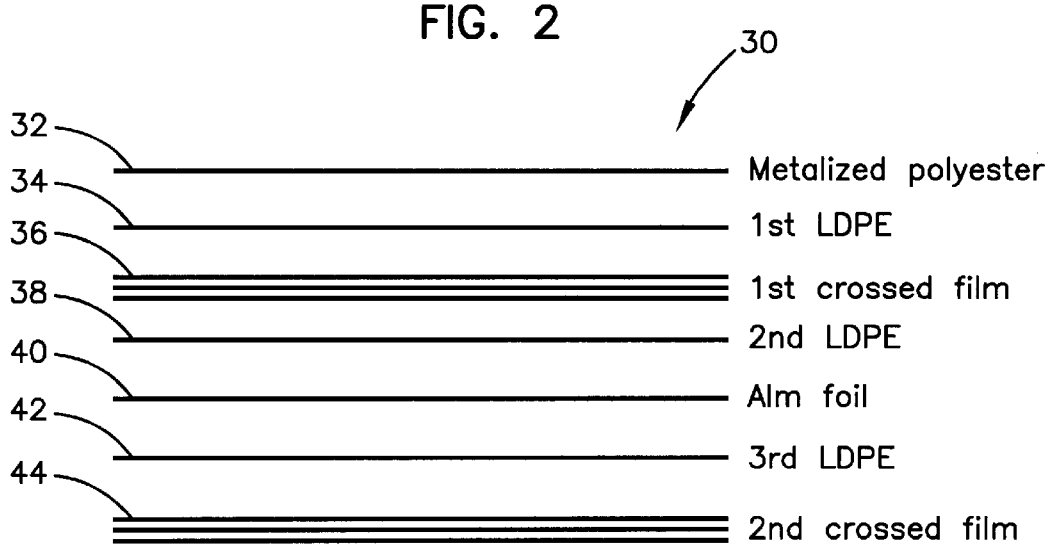
FIG. 2 is an illustration of the separate layers forming a second embodiment of a laminate according to the present invention.

A second example of a laminate is MILPAC 113 Plus laminate, shown in a separated view in FIG. 2.

The MILPAC 113 Plus laminate 30 is made up as follows:

17 g/sqm metallized polyester 32
20 g/sqm LDPE 34
70 g/sqm first crossed film 36
20 g/sqm LDPE 38
54 g/sqm aluminum foil 40
40 g/sqm LDPE 42
90 g/sqm crossed film 44

Example 3

MILPAC 143 laminate: a laminate made up as follows:

17 g/sqm metallized polyester
20 g/sqm LDPE
26 g/sqm aluminum foil
40 g/sqm LDPE
70 g/sqm crossed film

Example 4

MILPAC 153 laminate: a laminate made up as follows:

17 g/sqm metallized polyester 20 g/sqm LDPE 26 g/sqm aluminum foil 40 g/sqm LDPE 90 g/sqm crossed film Those different products which form the cover according to the present invention are manufactured by a process wherein each layer is secured to the other one by extrusion.

In order to highlight the specific particularities and the advantages obtained by using the products according to the present invention, comparisons have been made with conventional products which comprise:

Product A

GM24 material (Rhône-Poulenc) made as follows:

polyester aluminum linear polyethylene wherein the tie layers between the successive layers are made by glue laminating.

Product B

VACUMATIC material (Brangs+Heindrich) made up as follows:

polyester aluminum

Valeron wherein the tie layers between the successive layers are made by glue laminating.

Product C

VALSEM S165 material (SNEC) made up as follows:

polyester aluminum

Valeron wherein the tie layers between the successive layers are made by glue laminating.

Product D

MOISTOP 662 made up as follows:

polyester aluminum linear polyethylene wherein the tie layers between the successive layers are made by glue laminating.

As shown in the following tables, the conventional products are made up either of linear polyethylene which has no initiated tear resistance or of a VALERON material layer which is a flat biaxially-oriented film formed with two films having interleaved fibers and laminated together.

Table I shows the welding peel strength for seals made by heated welding grips in two conditions:

Condition (1): a temperature of 190° C. during 3 sec at a pressure of 3 bar.

Condition (2): a temperature of 170° C. during 2 sec at a pressure of 3 bar.

TABLE I

|  | Condition (1) | Condition (2) |
|---|---|---|
| MILPAC 143 | 98.96 N | 99.28 N |
| MILPAC 153 | 94.65 N | 73.35 N |
| MILPAC 113 | >110 N | >110 N |
| MILPAC 113+ | >110 N | >110 N |

TABLE I-continued

|  | Condition (1) | Condition (2) |
|---|---|---|
| PRODUCT A | 61.48 N | 76.28 N |
| PRODUCT B | 47.75 N | 41.10 N |
| PRODUCT C | 78.13 N | 75.20 N |

Table II shows peel and tensile strength for pulse weldings.

TABLE II

|  | Peel | Tensile |
|---|---|---|
| MILPAC 113 | 107.1 N | 151.9 N |
| MILPAC 113+ | 102 N | 177 N |
| PRODUCT A | 82.2 N | 148 N |
| PRODUCT B | 45 N | 123.1 N |
| PRODUCT C | 73 N | 137 N |
| PRODUCT D | 47.3 N | 101.7 N |

Table III shows initiated tear resistance (BS 2782 standard) either in machine direction or crosswise.

TABLE III

|  | Machine direction | Crosswise |
|---|---|---|
| PRODUCT A | 1.35 N | 2.18 N |
| PRODUCT B | 8.49 N | 4.55 N |
| PRODUCT C | 8.79 N | 6.12 N |
| PRODUCT D | 1.77 N | 1.34 N |
| MILPAC 143 | 11.51 N | 10.41 N |
| MILPAC 153 | 10.81 N | 12.94 N |
| MILPAC 113 | 29.12 N | 50.16 N |
| MILPAC 113+ | 23.73 N | 22.75 N |

Table IV shows the dynamical puncture resistance.

TABLE IV

|  | Puncture resistance |
|---|---|
| PRODUCT A | 1.8 J |
| PRODUCT B | 2.6 J |
| PRODUCT D | 1.3 J |
| MILPAC 143 | 2.8 J |
| MILPAC 153 | 3.5 J |
| MILPAC 113 | 4.5 J |
| MILPAC 113+ | 7.5 J |

Moreover, the method of manufacturing and the flexibility of the crossed film make the MILPAC products particularly flexible and consequently provide a perfect substrate for the aluminum foil which will not be damaged even if the product is creased or folded.

The products according to the present invention advantageously and surprisingly combine the following characteristics:

welding peel strength initiated tear resistance puncture resistance integrity of the aluminum foil.

Moreover, the MILPAC products have a better gas-tightness, in particular a better vapor tightness, with respect to the prior art products.

Table V describes the water vapor transmission rate for prior art products and products according to the invention.

TABLE V

| | Water vapor transmission (g/sqm/24 hr) |
|---|---|
| PRODUCT B | 0,06 |
| PRODUCT C | 0,05 |
| MILPAC 113 | 0,018 |
| MILPAC 143 | 0,001 |
| MILPAC 153 | 0,007 |

All MILPAC/CEPAC7 laminates are certified under the American standard MIL B 131 H which is less restrictive than the National European standards. MILPAC/CEPAC7 laminates 143 and 153 are used mainly for regular packagings of miscellaneous items, although 153 Plus (an improvement of 153) may be used for weapon packaging and for packaging small spare parts for airplanes.

The MILPAC/CEPAC7 laminates 113/113 Plus laminates are particularly useful with the NPP (Nitrogen Purging Packaging) system disclosed in our U.S. patent application Ser. No. 08/648,086, now U.S. Pat. No. 5,794,408 because they are sufficiently gas-proof to retain a nitrogen atmosphere inside the cover. Those laminates are used mainly for large pieces of equipment.

As noted above, the present invention is applicable to laminates for packaging. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and products.

We claim:

1. A packaging cover, comprising at least:
   a polymer cross-ribbed film with a layer weight in the range 45 and 300 g/sqm,
   a substantially gas-permeable film, and
   a strong printable laminate,
   wherein the polymer cross-ribbed film is a biaxially-stretched laminated film of at least three plies of polyolefins, so as to obtain by laminating and stretching an interlock arrangement, an inner portion of the laminated film comprising a mixture of olefins, the inner portion including at least one of said three plies of polyolefin.

2. A packaging cover according to claim 1, wherein the strong printable laminate is a second crossed film.

3. A packaging cover according to claim 1, wherein the strong printable laminate is a polyester laminate.

4. A packaging cover according to claim 1, wherein the strong printable laminate is formed from a material selected from the group consisting of polyethylene terephthalate (PET) and polyethylene naphthalate (PEN) laminates.

5. A packaging cover according to claim 1, wherein the strong printable laminate is metallized.

6. A packaging cover according to claim 1, wherein the polymer cross-ribbed film has a layer weight in the range of 70–180 gm/sgm.

7. A packaging cover according to claim 1, wherein the substantially gas-impermeable film includes an aluminum foil having a thickness in the range of 7–25 µm.

8. A packaging cover according to claim 1, further comprising a tie-layer between the polymer cross-ribbed film and the substantially gas-impermeable film.

9. A packaging cover according to claim 1, further comprising a tie-layer between the substantially gas-impermeable film and the strong printable laminate.

10. A packaging cover according to claim 1, wherein adjacent layers are secured together by extrusion.

11. A packaging cover according to claim 1, wherein adjacent layers are secured together by a glue lamination.

12. A packaging cover according to claim 1, wherein adjacent layers are secured together both by extrusion and a glue lamination.

13. A packaging cover comprising:
   a metallized polyester laminate;
   a first low density polyethylene (LDPE) laminate over the metallized polyester laminate;
   an aluminum foil over the first LDPE laminate;
   a second LDPE laminate over the aluminum foil; and
   a polymer cross-ribbed film over the second LDPE laminate, the polymer cross-ribbed film being a biaxially-stretched laminated film of polyolefins, so as to obtain by laminating and stretching an interlock arrangement, an inner portion of the polymer cross-ribbed film comprising a mixture of olefins, the inner portion of the polymer cross-ribbed film including at least one of said polyolefins.

14. A packaging cover, comprising
   a metallized polyester laminate;
   a first LDPE layer over the metallized polyester laminate;
   a first polymer cross-ribbed film layer over the first LDPE layer;
   a second LDPE layer over the first polymer cross-ribbed film layer;
   an aluminum foil over the second LDPE layer;
   a third LDPE layer over the aluminum foil; and
   a second polymer cross-ribbed film including a biaxially-stretched laminated film of polyolefins, so as to obtain by laminating and stretching an interlock arrangement, an inner portion of the second polymer cross-ribbed film comprising a mixture of olefins, the inner portion of the second polymer cross-ribbed film including at least one of said polyolefins.

* * * * *

UNITED STATES PATENT AND TRADEMARK OFFICE
CERTIFICATE OF CORRECTION

PATENT NO. : 6,403,176 B1
DATED : June 11, 2002
INVENTOR(S) : Patouraux et al.

It is certified that error appears in the above-identified patent and that said Letters Patent is hereby corrected as shown below:

<u>Column 9,</u>
Line 40, "range 45" should read -- range of 45 --
Line 41, "gas-permeable" should read -- gas-impermeable --

<u>Column 10,</u>
Line 5, "180 gm/sgm" should read -- 180 gm/sqm --

Signed and Sealed this

First Day of April, 2003

JAMES E. ROGAN
*Director of the United States Patent and Trademark Office*